United States Patent
Hirao et al.

(10) Patent No.: US 11,914,119 B2
(45) Date of Patent: Feb. 27, 2024

(54) ULTRAVIOLET OPTICAL SYSTEM AND LIGHT DISTRIBUTION MEASURING APPARATUS

(71) Applicant: Konica Minolta, Inc., Tokyo (JP)

(72) Inventors: Yusuke Hirao, Takatsuki (JP); Takashi Kawasaki, Sakai (JP)

(73) Assignee: KONICA MINOLTA, INC., Tokyo (JP)

( * ) Notice: Subject to any disclaimer, the term of this patent is extended or adjusted under 35 U.S.C. 154(b) by 215 days.

(21) Appl. No.: 17/613,344

(22) PCT Filed: Feb. 3, 2020

(86) PCT No.: PCT/JP2020/003948
§ 371 (c)(1),
(2) Date: Nov. 22, 2021

(87) PCT Pub. No.: WO2020/235145
PCT Pub. Date: Nov. 26, 2020

(65) Prior Publication Data
US 2022/0221697 A1     Jul. 14, 2022

(30) Foreign Application Priority Data

May 23, 2019     (JP) .................................. 2019-096586

(51) Int. Cl.
*G02B 13/14*     (2006.01)
*G01J 1/00*     (2006.01)
(Continued)

(52) U.S. Cl.
CPC ................ *G02B 13/14* (2013.01); *G01J 1/00* (2013.01); *G01M 11/00* (2013.01); *H04N 23/55* (2023.01)

(58) Field of Classification Search
None
See application file for complete search history.

(56) References Cited

U.S. PATENT DOCUMENTS 8,913,316 B2 * 12/2014 Dodoc ................... G02B 17/08
                                                        359/365
2016/0062111 A1 * 3/2016 Nobis ................ G02B 13/0095
                                                        359/368

FOREIGN PATENT DOCUMENTS

JP     H09-264782 A     10/1997
JP     H10-3033 A     1/1998
(Continued)

OTHER PUBLICATIONS

PCT, International Search Report for the corresponding application No. PCT/JP2020/003948, dated Mar. 10, 2020, with English translation.

(Continued)

*Primary Examiner* — Eileen M Adams
(74) *Attorney, Agent, or Firm* — LUCAS & MERCANTI, LLP

(57) ABSTRACT

An ultraviolet optical system includes an objective lens group that captures ultraviolet light for each angle from an ultraviolet light source and forms an intermediate image, and an imaging lens group that re-images the intermediate image. Neither the objective lens group nor the imaging lens group has a cemented surface, and all lenses included in the objective lens group and in the imaging lens group are single lenses that transmit ultraviolet light having a wavelength of 300 nm or shorter. A light distribution measuring apparatus includes the ultraviolet optical system and a sensor, and outputs light distribution of the ultraviolet light source by using a signal obtained by the sensor. The ultraviolet optical system is positioned such that the intermediate image is re-imaged on a light receiving sensor surface, and the sensor has light receiving sensitivity to ultraviolet light having a wavelength of 300 nm or shorter.

12 Claims, 6 Drawing Sheets

(51) Int. Cl.
*G01M 11/00* (2006.01)
*H04N 23/55* (2023.01)

(56) References Cited

FOREIGN PATENT DOCUMENTS

| JP | H11-295606 A | 10/1999 |
| JP | 2002-311332 A | 10/2002 |
| JP | 3594706 B2 | 12/2004 |

OTHER PUBLICATIONS

PCT, Written Opinion for the corresponding application No. PCT/JP2020/003948, dated Mar. 10, 2020, with English translation.
"Conoscopy," Wikepedia, retrieved Jan. 4, 2022 from https://en.wikipedia.org/wiki/Conoscopy.

* cited by examiner

EX2

ULTRAVIOLET OPTICAL SYSTEM AND LIGHT DISTRIBUTION MEASURING APPARATUS

CROSS REFERENCE TO RELATED APPLICATION

This Application is a 371 of PCT/JP2020/003948 filed on Feb. 3, 2020 which, in turn, claimed the priority of Japanese Patent Application No. 2019-096586 filed on May 23, 2019, and both applications are incorporated herein by reference.

TECHNICAL FIELD

The present invention relates to an ultraviolet optical system and a light distribution measuring apparatus, and for example, relates to an ultraviolet optical system that images ultraviolet light, and a light distribution measuring apparatus that images ultraviolet light for each angle from an ultraviolet light source by using the ultraviolet optical system and outputs the formed image as a light distribution characteristic.

BACKGROUND ART

A light distribution characteristic of a light source has a great influence on a specification of a lighting apparatus or a display apparatus. Therefore, it is important to measure a light distribution characteristic of the light source. Generally, a light distribution characteristic of a light source is measured by moving the light source with respect to a sensor by stages and evaluating the light distribution characteristic as an angle characteristic (Sensor mobile-type light distribution measurement, refer to Patent Literature 1). In addition, because sensors have been increasing in size in these days, light for each angle from a light source can be captured at one time by an optical system. If such a sensor is used, a light distribution characteristic can be measured at one time (Sensor fixed-type light distribution measurement). For example, Non Patent Literature 1 proposes a method for capturing light for each angle from a light source with an optical system at one time and imaging the light on a two-dimensional sensor to measure a light distribution characteristic at one time.

CITATION LIST

Patent Literature

Patent Literature 1: Japanese Patent No. 3594706

Non Patent Literature

Non Patent Literature 1: https://en.wikipedia.org/wiki/Conoscopy

SUMMARY OF INVENTION

Technical Problem

In recent years, a light emitting diode (LED) that emits ultraviolet light has been developed, and opportunities for utilizing the LED as an ultraviolet light source have been increased. However, unlike visible light, ultraviolet light can be transmitted through limited types of materials, and therefore an ultraviolet optical system used for light distribution measurement of an ultraviolet light source has not been put into practical use. That is, in a conventional optical configuration as proposed in Patent Literature 1 or Non Patent Literature 1, transmission loss of ultraviolet light is too large, and light distribution of an ultraviolet light source cannot be measured with high accuracy.

The present invention has been made in view of circumstances, and an object of the present invention is to provide an ultraviolet optical system capable of capturing ultraviolet light for each angle from an ultraviolet light source at one time, and a light distribution measuring apparatus capable of measuring light distribution of the ultraviolet light source with high accuracy by using the ultraviolet optical system.

Solution to Problem

In order to achieve the above object, an ultraviolet optical system of the present invention includes an objective lens group that captures ultraviolet light for each angle from an ultraviolet light source and forms an intermediate image, and an imaging lens group that re-images the intermediate image, in which neither the objective lens group nor the imaging lens group has a cemented surface, and all lenses included in the objective lens group and in the imaging lens group are single lenses that transmit ultraviolet light having a wavelength of 300 nm or shorter.

A light distribution measuring apparatus of the present invention includes the ultraviolet optical system of the present invention and a sensor that converts an optical image formed on a light receiving sensor surface into an electrical signal, the light distribution measuring apparatus outputting light distribution of the ultraviolet source by using the signal obtained by the sensor, in which the ultraviolet optical system is positioned such that the intermediate image is re-imaged on the light receiving sensor surface, and the sensor has light receiving sensitivity to ultraviolet light having a wavelength of 300 nm or shorter.

Advantageous Effects of Invention

According to the present invention, neither the objective lens group nor the imaging lens group has a cemented surface, and all lenses included in the objective lens group and in the imaging lens group are single lenses that transmit Ultraviolet light having a wavelength of 300 nm or shorter, and therefore, the ultraviolet optical system capable of capturing ultraviolet light for each angle from the ultraviolet light source at one time can be implemented. Then, light distribution of the ultraviolet light source can be measured with high accuracy at one time by the ultraviolet optical system together with a sensor having light receiving sensitivity to ultraviolet light of a wavelength of 300 nm or shorter being used for the light distribution measuring apparatus.

BRIEF DESCRIPTION OF DRAWINGS

In FIG. 3A, a combination of lens surfaces that constitute space between lenses is a combination of a concave surface and a convex surface.

In FIG. 3B, a combination of lens surfaces that constitute space between lenses is a combination of a convex surface and a convex surface.

DESCRIPTION OF EMBODIMENTS

Figure 1:
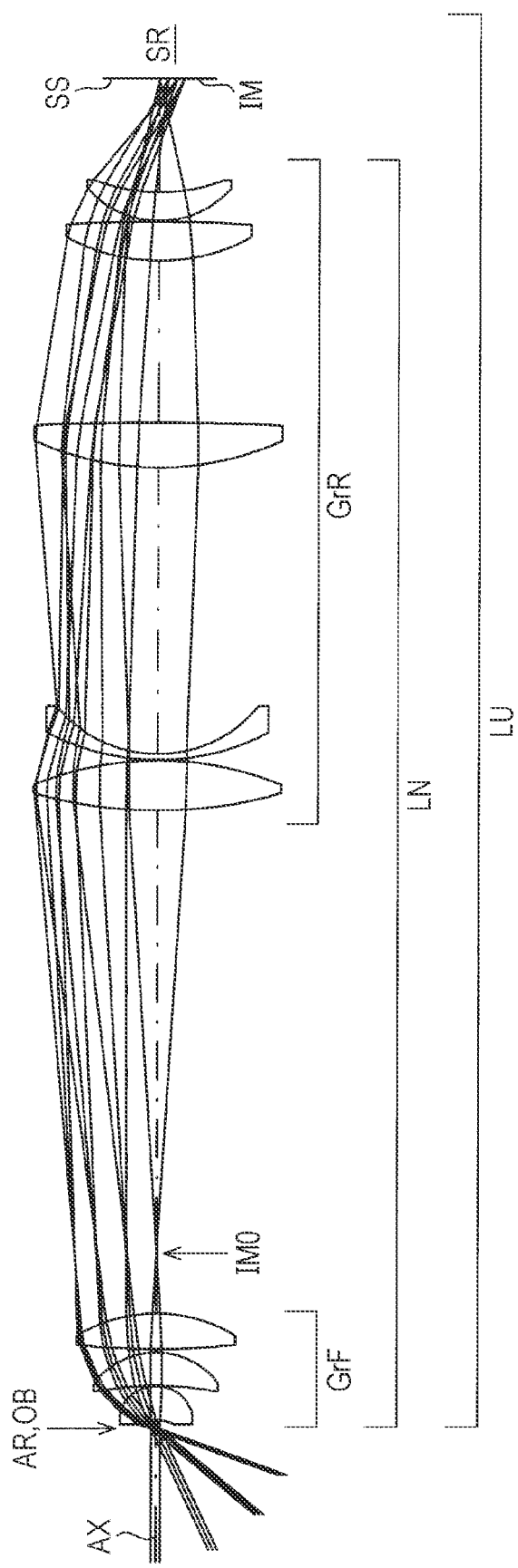
FIG. 1 is a diagram of an optical configuration according to a first embodiment (Example 1).

Hereinafter, air ultraviolet optical system and light distribution measuring apparatus according to embodiments of the present invention will be described. The ultraviolet optical system according to the embodiments of the present invention includes an objective lens group that captures ultraviolet light for each angle from air ultraviolet light source and forms an intermediate image, and an imaging lens group that re-images the intermediate image. Furthermore, neither the objective lens group nor the imaging lens group has a cemented surface, and all lenses included in the objective lens group and in the imaging tens group are single lenses that transmit ultraviolet light having a wavelength of 300 nm or shorter, Examples of application of the ultraviolet light source include ultraviolet excitation for fluorescent light illumination or fluorescent image display, ultraviolet sterilization, and the like. In addition, because an LED light source (for example, a diameter of a measurement area to be evaluated is 3 mm, and a light-emitting point size is 100 μm) is increasingly utilized as an ultraviolet light source, there is a demand for expanding or changing a measured wavelength range from the visible light region to the ultraviolet region. However, if an optical material for visible light is used for the ultraviolet optical system, most of ultraviolet light is absorbed and cannot be transmitted, and cannot reach the sensor. Even in a case where an optical material for ultraviolet light is used, transmission loss is large as compared to a case of visible light. Therefore, how much transmission loss is minimized in an optical system is important.

As described above, if both the objective lens group and the imaging lens group that constitute the ultraviolet optical system are formed not to have a cemented surface, absorption by a cement member such as an adhesive used for the cemented surface is eliminated, and reflection loss on the cemented surface is also eliminated. In addition, because lenses included in the ultraviolet optical system are only single lenses that transmit ultraviolet light having a wavelength of 300 nm or shorter, transmission loss due to an optical material is also reduced, and transmission efficiency of the optical system is improved. Therefore, the transmission loss in the optical system can be minimized, and ultraviolet light for each angle from the ultraviolet light source can be captured at one time. Furthermore, light distribution of the ultraviolet light source can be measured with high accuracy at one time by using, for the light distribution measuring apparatus, the ultraviolet optical system having the above-described characteristic configuration together with a sensor having light receiving sensitivity to ultraviolet light of a wavelength of 300 nm or shorter.

Described below are conditions and the like for obtaining the above-described effects in a well-balanced manner and for achieving higher optical performance, higher accuracy of light distribution measurement, lighter weight, smaller size, and the like. It should be noted that light distribution of the ultraviolet light source is to indicate, with a change in or distribution of luminous intensity with respect to an angle, in which direction (angle) and how much intense ultraviolet light is emitted from the ultraviolet light source.

With respect to all the single lenses used in the above-described ultraviolet optical system, transmittance to ultraviolet light having a wavelength of 300 nm preferably 80% or longer, and more preferably, 97% or more. By using single lenses having such ultraviolet transmittance, light distribution of the ultraviolet light source can be effectively measured with high accuracy. In addition, specific examples of an optical material of the above-described single lenses include $CaF_2$, $BaF_2$, and $SiO_2$. It should be noted that a refractive index of these optical materials at a wavelength of 300 nm is about 1.5.

With respect to inter-surfaces of all the lenses, It is preferable that difference between a minimum inter-surface distance and a maximum inter-surface distance be equal to or longer than a working distance. Of ultraviolet light reflected between the surfaces of the lenses, ultraviolet light reflected at an angle with a large amount of light may have a great influence on accuracy of light distribution measurement. With respect to inter-surfaces of all the lenses, the influence on accuracy of light distribution measurement can be avoided by sufficiently changing inter-surface spacing between on-axis and off-axis, and the longer an overall length of optical of the ultraviolet optical system, the greater effect of reducing the influence.

Figure 3A:
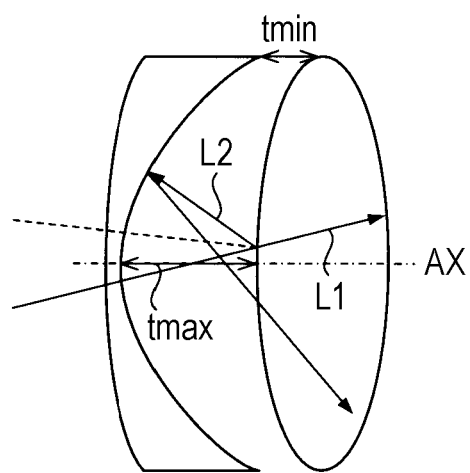
FIG. 3A is a schematic diagram that illustrates inter-surface reflection in an ultraviolet optical system.
Figure 3B:
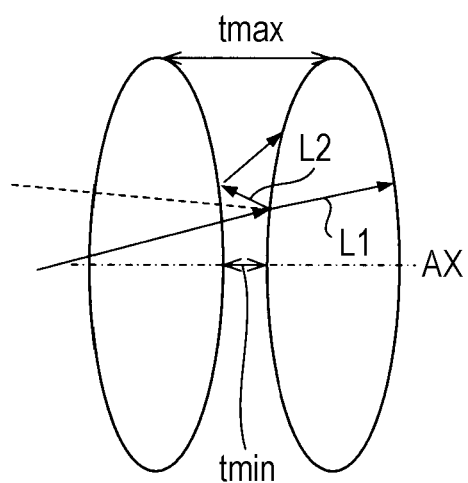
FIG. 3B is a schematic diagram that illustrates inter-surface reflection in an ultraviolet optical system.

FIG. 3 illustrates a specific example of inter-surface reflection in the ultraviolet optical system, As illustrated in FIG. 3A, if a combination of lens surfaces that constitute space between lenses is a combination of a concave surface and a convex surface, a minimum inter-surface distance tmin is created at end portions of the lens surfaces, and a maximum inter-surface distance tmax is created on an optical axis AX of the lens surfaces. As illustrated in FIG. 3B, if a combination of lens surfaces that constitute space between lenses is a combination of a convex surface and a convex surface, a minimum inter-surface distance tmin is created on the optical axis AX of the lens surfaces, and a maximum inter-surface distance tmax is created at end portions of the lens surfaces.

In both the cases of FIGS. 3A and 3B, normal light L1 is transmitted through the lens surfaces, and unwanted light L2 is reflected on a lens surface and travels toward a peripheral portion of the lenses. That is, the smaller the inter-surface distance difference tmax-tmin is, the more unwanted light L2 that travels toward the sensor is likely to be generated due to reflection between mutually inclined lens surfaces. On the basis of a relation between a maximum measurement angle in the light distribution measurement and a working distance, if the inter-surface distance difference tmax-tmin is set equal to or longer than the working distance, the unwanted light L2 that reaches the sensor can be reduced, and a detection error due to the unwanted light L2 can be effectively reduced.

The following conditional expression (1) is preferably satisfied.

$$\varphi/\varphi 1 > 2 \tag{1}$$

where
- φ1 is an effective diameter of a lens surface positioned closest to an object side in an objective lens group, and
- φ1 is a maximum effective diameter of lens surfaces in an entire system.

Figure 4:
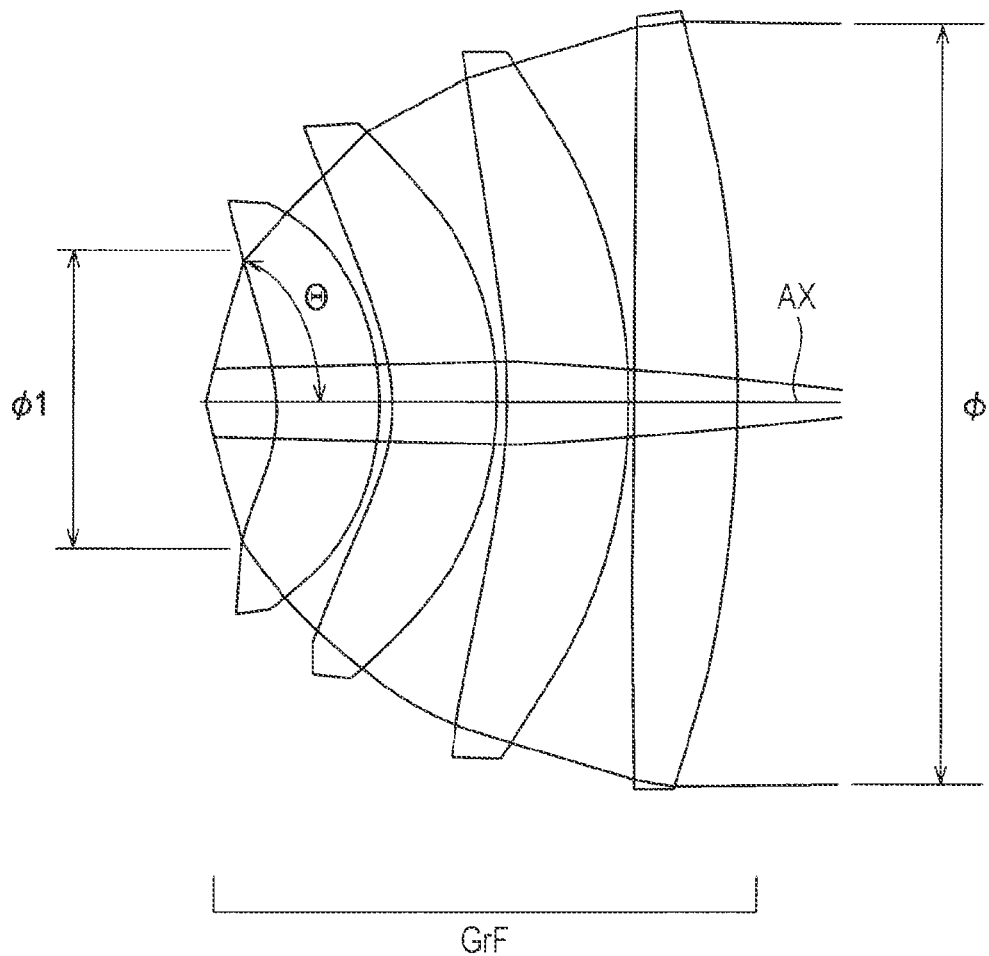
FIG. 4 is an optical path diagram that illustrates a relation between a most-object-side effective diameter and a maximum effective diameter in the ultraviolet optical system.

FIG. 4 illustrates an optical path diagram that illustrates a relation between a most-object-side effective diameter φ1 and a maximum effective diameter φ in the ultraviolet optical system. In an objective lens group GrF, if light rays traveling in a diagonal direction at a maximum measurement angle Θ=70° to 80° are to be gradually bent toward a light receiving sensor surface, three to four lenses are required to be used with a refractive index of an optical material for ultraviolet light. If the conditional expression (1) is satisfied even with the small number of lenses, light rays of a wide angle can be gradually bent and captured. As a result, an incident angle to the lens surfaces of the objective lens group can be reduced, and loss in amount of light can be reduced. If the conditional expression (1) is not satisfied, performance tends to be lowered due to a relatively decreased number of light rays traveling in the diagonal direction, or a larger number of thin lenses that are difficult to manufacture are required, causing difficulty in lens design it should be noted that, although FIG. 4 illustrates a case Where a lens surface having the maximum effective diameter φ exists in the objective lens group GrF, similar applies to a case where the lens surface exists in an imaging lens group.

It is preferable that a lens surface closest to the object side have a concave shape with respect to the object side, and the following conditional expression (2) be satisfied $$\varphi 2 > WD \quad (2)$$

where
φ1=φ2+2WD tan Θ holds
when
- WD is a distance from a most-object-side position of a most-object-side lens to a measurement area with respect to an ultraviolet light source,
- φ2 is an effective diameter of the measurement area with respect to the ultraviolet light source,
- φ1 is an effective diameter of a lens surface positioned closest to an object side in an objective lens group, and
- Θ is an angle formed by a principal light ray of a light flux having a maximum measurement angle and the optical axis.

Figure 5:
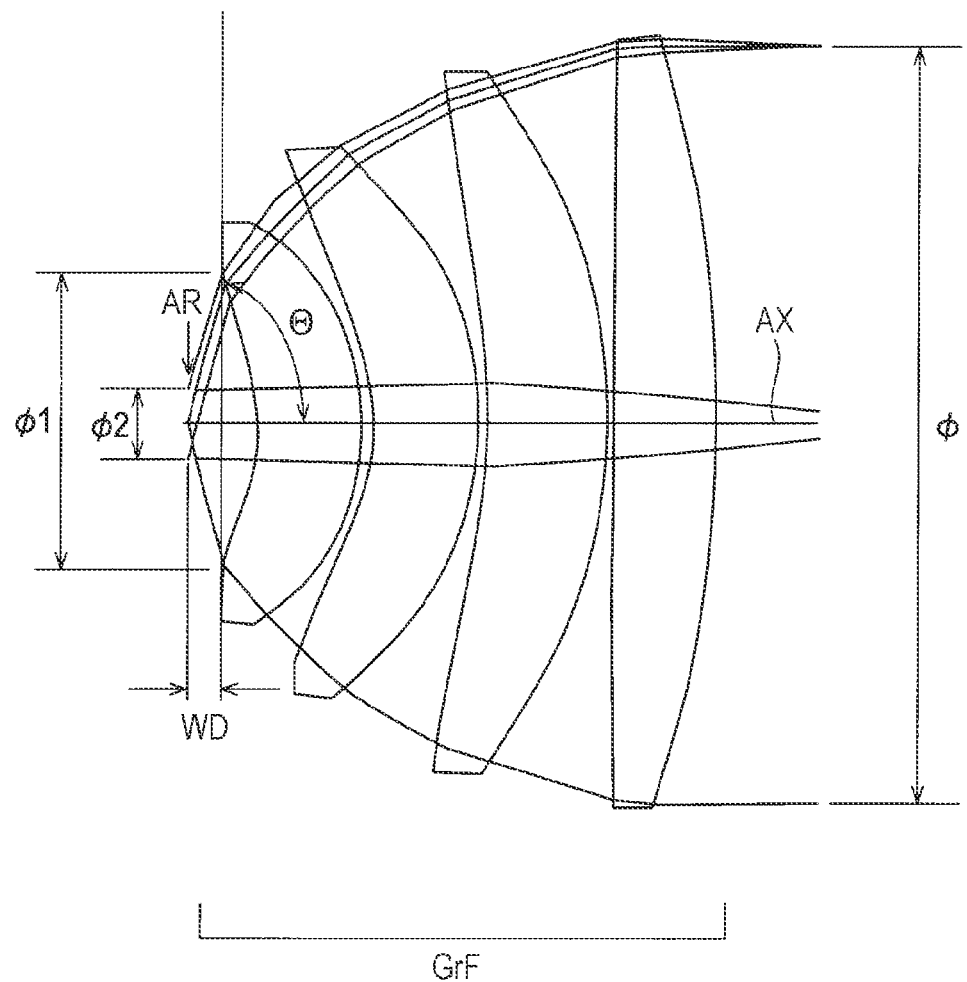
FIG. 5 is an optical path diagram that illustrates a relation between a measurement area effective diameter and a working distance in the ultraviolet optical system.

FIG. 5 illustrates a relation between a measurement area effective diameter φ2 of the measurement area and the working distance WD in the ultraviolet optical system. An effective diameter φ1 of a most-object-side lens surface is determined by an upper light ray having a maximum emission angle, and is calculated with a mathematical formula using φ2, Θ, and WD, which is φ1=φ2+2WD tan Θ. If the working distance WD is long, an angle Θ cannot be set large, and if the working distance WD is set shorter than an effective diameter φ2 of a measurement area AR, light emitted at a more oblique angle can be captured. That is, by satisfying the conditional expression (2), it is possible to measure up to an emission angle wider than 45 degrees. It should be noted that, although FIG. 5 illustrates a case where a lens surface having the maximum effective diameter φ exists in the objective lens GrF, similar applies to a case where the lens surface exists in an imaging lens group.

Assuming that an angle formed by an on-axis light ray and an optical axis is a positive angle when the on-axis light ray travels away from the optical axis, it is preferable that an angle α formed by a principal light ray of an off-axis light flux and the optical axis in the intermediate image be a positive angle. It is generally known that a principal light ray off an axis in an intermediate image plane is set parallel to an optical axis, so that an angle characteristic has linearity in a spatial direction. However, it is possible to comprehensively optimize imaging performance on the light receiving sensor surface with a front objective lens group and a rear imaging lens group, even if the angle α formed by the principal light ray of the off-axis light flux and the optical axis is set to be positive in the intermediate image.

For example, priority is given to capturing at a wider angle in the front objective lens group, and a principal light ray of off-axis light flux may remain angled on the intermediate image plane. That is, it is not necessary to completely bend the principal light ray until the principal light ray becomes parallel to the optical axis, and because an optical material to be used is limited, imaging performance of the intermediate image is not a problem. Because the intermediate image is only required to be formed in a planar shape on the light receiving sensor surface, the principal light ray off the axis in the intermediate image may be a positive angle. Therefore, the imaging performance can be optimized as a whole by the rear imaging lens group not only controlling magnification, but also correcting an angle characteristic remaining in the front objective lens group.

Figure 2:
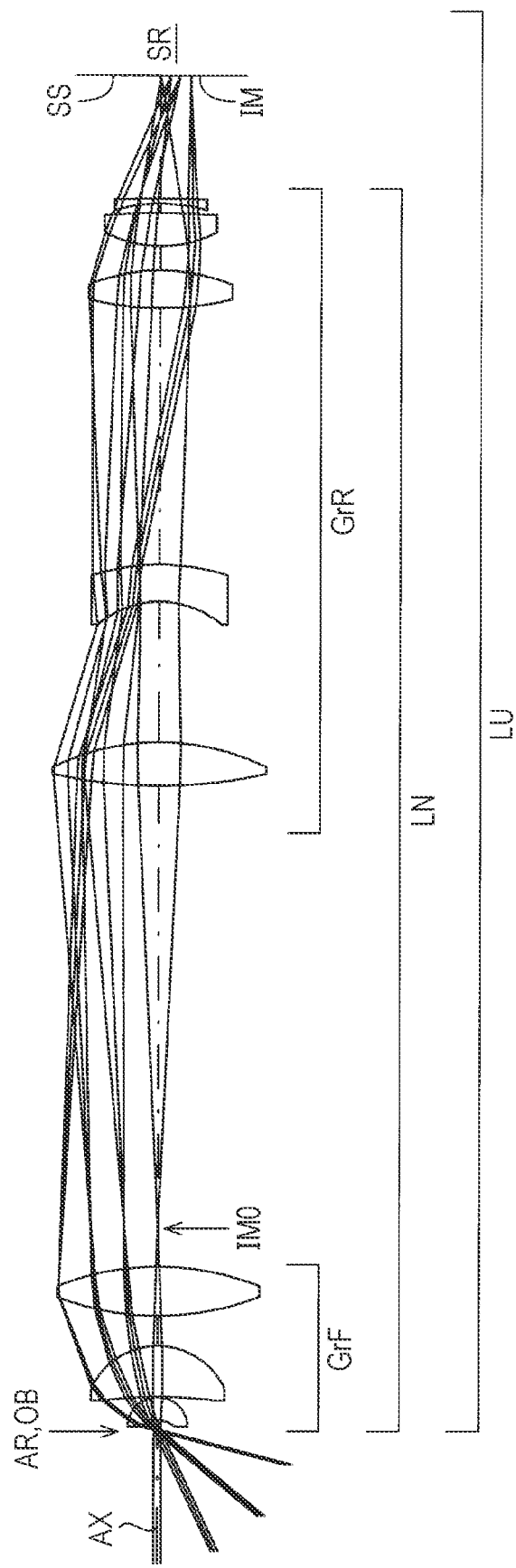
FIG. 2 is a diagram of an optical configuration according to a second embodiment (Example 2).

Next, specific optical configurations of an ultraviolet optical system and light distribution measuring apparatus including the ultraviolet optical system will be described with reference to the first and second embodiments thereof. FIG. 1 illustrates, by using an optical cross section, an optical configuration of an ultraviolet optical system LN and light distribution measuring apparatus LU according to the first embodiment, and FIG. 2 illustrates, by using an optical cross section, an optical configuration of an ultraviolet optical system LN and light distribution measuring apparatus LU according to the second embodiment. The light distribution measuring apparatus LU according to the first or second embodiment includes the ultraviolet optical system LN that captures ultraviolet light for each angle from the ultraviolet light source at one time and images the ultraviolet light as an optical image IM, and a two-dimensional sensor (image sensor) SR that converts the optical image IM formed on a light receiving sensor surface SS into an electrical signal, and the light distribution measuring apparatus LU is formed to output light distribution of the ultraviolet light source by using a signal obtained by time two-dimensional sensor SR.

The ultraviolet optical system LN according to the first or second embodiment includes the objective lens group GTE that captures ultraviolet light for each angle from the ultraviolet light source and forms an intermediate image IM0, and an imaging lens group GrR that re-images the intermediate image IM0, In the ultraviolet optical system LN (FIG. 1) of the first embodiment, the objective lens group GrF includes three positive single lenses, and the imaging lens group GrR includes five single lenses of positive, negative, positive, positive, and positive. In the ultraviolet optical system LN (FIG. 2) of the second embodiment, the objective lens group GrF includes three positive single lenses, and the imaging lens group GrR includes five single lenses of positive, negative, positive, positive, and negative.

Neither the objective lens group GrF nor the imaging lens group GrR has a cemented surface, and all lenses included in the objective lens group GrF and in the imaging lens group GrR are single lenses that transmit ultraviolet light having a wavelength of 300 nm or shorter. Because the ultraviolet region is narrower than the visible light region, high optical performance can be obtained by combining single lenses without using a cemented lens. The measurement area AR with respect to the ultraviolet light source corresponds to an object plane OB of the ultraviolet optical system LN. When a sample of the ultraviolet light source to be evaluated is placed at the measurement area AR, ultraviolet light emitted from the ultraviolet light source at each emission angle is bent by the ultraviolet optical system LN. Because configuration is such that the intermediate image IM0 is formed by strong power of the objective lens group GrF bending ultraviolet light having a wide emission angle first, and the intermediate image IM0 is re-imaged by the imaging lens group GrR, a capturing angle from the measurement area AR with respect to the ultraviolet light source can be widened. It should be noted that brightness can be adjusted by using a diaphragm as necessary.

As can be seen from FIGS. 1 and 2, with respect to inter-surfaces of all the lenses in the ultraviolet optical system LN, difference between a minimum inter-surface distance and a maximum inter-surface distance is equal to or longer than a working distance. Because unwanted light generated due to reflection between mutually inclined lens surfaces travels toward a peripheral portion of a lens (FIG. 3), the unwanted light reaching the two-dimensional sensor SR decreases. As a result, detection errors due to unwanted light are effectively reduced, and a highly accurate light distribution measurement of the ultraviolet light source is possible.

The two-dimensional sensor SR has light receiving sensitivity to ultraviolet light having a wavelength of 300 nm or shorter, and the ultraviolet optical system LN is positioned such that the intermediate image IM0 is re-imaged as the optical image IM on the light receiving sensor surface SS. The optical image IM formed on the light receiving sensor surface SS by re-imaging the intermediate image IM0 is converted into an electrical signal by the two-dimensional sensor SR. Because the optical image IM includes light distribution information of the ultraviolet light source as emission angle distribution, a light distribution characteristic of the ultraviolet light source can be obtained by the light distribution measuring apparatus LU.

As can be seen from the above description, the embodiments described above and Examples described later include the following characteristic configurations (#1) to (#6) or the like.

(#1): An ultraviolet optical system including an objective lens group that captures ultraviolet light for each angle from an ultraviolet light source and forms an intermediate image, and an imaging lens group that re-images the intermediate image, in which neither the objective lens group nor the imaging lens group has a cemented surface, and all lenses included in the objective lens group and in the imaging lens group are single lenses that transmit ultraviolet light having a wavelength of 300 nm or shorter.

(#2): The ultraviolet optical system according to (#1), in which, with respect tai inter-surfaces of all the lenses, difference between a minimum inter-surface distance and a maximum inter-surface distance is equal to or longer than a working distance.

(#3): The ultraviolet optical system according to (#1) or (#2), the ultraviolet optical system satisfying the following conditional expression (1):

$$\varphi/\varphi 1 > 2 \quad (1)$$

where $\varphi 1$ is an effective diameter of a lens surface positioned closest to an object side in an objective lens group, and $\varphi$ is a maximum effective diameter of lens surfaces in an entire system.

(#4): The ultraviolet optical system according to any one of (#1) to (#3), the ultraviolet optical system including the lens surface closest to the object side having a concave shape on the object side, and the ultraviolet optical system satisfying the following conditional expression (2):

$$\varphi 2 > WD \quad (2)$$

where $\varphi 1 = \varphi 2 + 2WD \tan \Theta$ holds when

WD is a distance from a most-object-side position of a most-object-side lens to a measurement area with respect to an ultraviolet light source, $\varphi 2$ is an effective diameter of the measurement area with respect to the ultraviolet light source, $\varphi 1$ is an effective diameter of a lens surface positioned closest to an object side in an objective lens group, and $\Theta$ is an angle formed by a principal light ray of a light flux having a maximum measurement angle and the optical axis.

(#5): The ultraviolet optical system according to any one of (#1) to (#4), in winch, assuming that an angle formed by an on-axis light ray and an optical axis is a positive angle when the on-axis light ray travels away from the optical axis, an angle α formed by a principal light ray of an off-axis light flux and the optical axis in the intermediate image is a positive angle.

(#6): A light distribution measuring apparatus including the ultraviolet optical system according to any one of (#1) to (#5) and a sensor that converts an optical image formed on a light receiving sensor surface into an electrical signal, the light distribution measuring apparatus outputting light distribution of the ultraviolet light source by using the signal obtained by the sensor, in which the ultraviolet optical system is positioned such that the intermediate image is re-imaged on the light receiving sensor surface, and the sensor has light receiving sensitivity to ultraviolet light having a wavelength of 300 nm or shorter,

EXAMPLES

Hereinafter, configurations and the like of the ultraviolet optical system that implemented the present invention will be described more specifically with reference to construction data and the like in Examples. Examples 1, 2 (EX 1, 2) described here are numerical examples corresponding to the above-described first and second embodiments, respectively, and lens configuration diagrams representing the first and second embodiments (FIGS. 1 and 2) illustrate optical configurations of the corresponding Examples 1, 2, respectively.

The construction data in each of the Examples indicate surface data including, in order from a left column, surface number i (OB: object plane, IM: image plane), paraxial curvature radius ri (mm), on-axis inter-surface spacing (core thickness) di (mm), refractive index n (300) with respect to ultraviolet light having a wavelength of 300 nm, and effective radius Ri (mm). In addition, illustrated as various data are, of an entire system, a focal length f (mm), an F-number (Fno), a sensor size Y (half of length of a diagonal line of a light receiving, sensor surface SS, mm), an angle Θ(°) formed by a principal light ray of a light flux of a maximum measurement angle with an optical axis AX, an angle α(°) formed by a principal light ray of an off-axis light flux and the optical axis AX in an intermediate image IM0, and values corresponding to conditional expressions of each of the Examples along with related data thereof.

All the single lenses used in each of the Examples have a refractive index of 1.5 with respect to ultraviolet light having a wavelength of 300 am and a transmittance of 97% or more with respect to ultraviolet light having a wavelength of 300 nm. In addition, specific examples of an optical material included these single lenses include $CaF_2$, $BaF_2$, and $SiO_2$.

The ultraviolet optical system LN of Example 1 has a configuration that is easy to implement. For example, an easily available small two-dimensional sensor SR having a small sensor size Y is assumed. In addition, the maximum effective diameter φ of the lens surfaces in the entire system limited to 83.04 mm is not so large as a maximum lens diameter. Because the F-number of 2.4, which is bright, allows for easy measurement, and the principal light ray angle Θ of the maximum measurement angle supports up to 70 degrees, which is satisfactory.

The ultraviolet optical system LN of Example 2 has a configuration that implements a larger maximum measurement angle Θ. For example, a sensor size Y is large, and a setting is made so that measurement can be performed without reducing angle resolution. In addition, the maximum effective diameter φ of the lens surfaces in the entire system limited to 86.5 ram is not so large as a maximum lens diameter. The principal light ray angle Θ of the maximum measurement angle supports up to 80 degrees, which is a more severe configuration as an optical system. Because the angle α is large in a negative value, the ultraviolet optical system LN of Example 2 has little design flexibility as compared to Example 1, and the angle α is in a circumstance of excessive correction.

Figure 6:
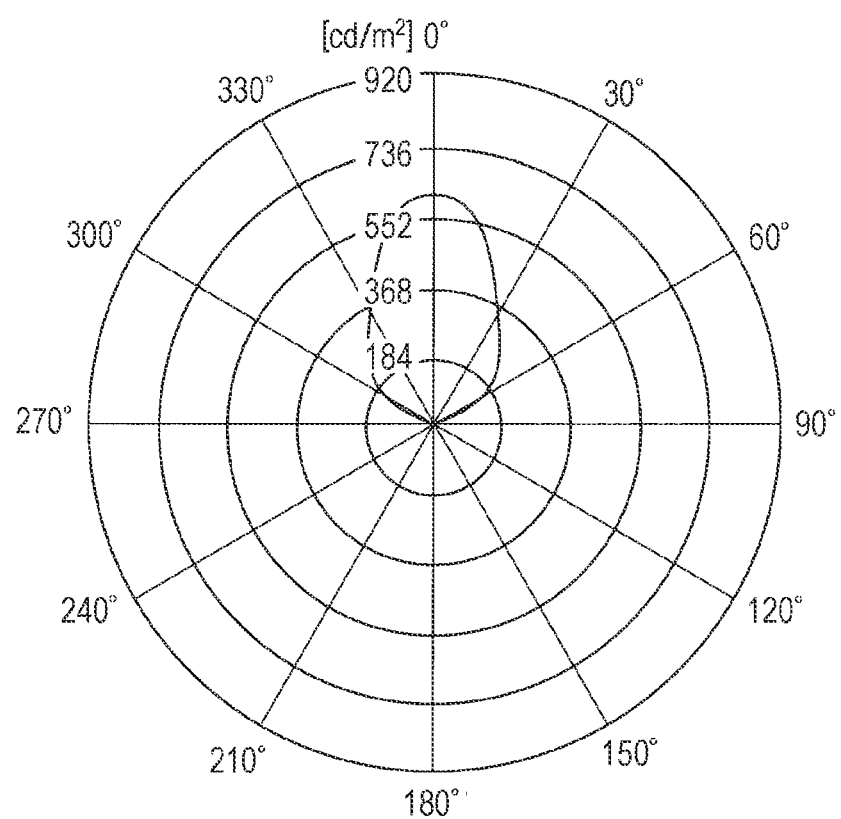
FIG. 6 is a graph that schematically illustrates a result of a light distribution measurement obtained by a light distribution measuring apparatus according to Examples 1, 2.

By using one of the ultraviolet optical systems LN of Examples 1, 2, it is possible to capture ultraviolet light for each angle from the ultraviolet light source at one time and image the ultraviolet light on the light receiving sensor surface SS of the two-dimensional sensor SR. Furthermore, by using the tight distribution measuring apparatus LU including the ultraviolet optical system LN, light distribution of the ultraviolet light source can be measured with high accuracy at one time. The graph in FIG. 6 schematically illustrate a result of a light distribution measurement obtained by the light distribution measuring apparatus LU according to Examples 1, 2. From this measurement result, it can be seen that the ultraviolet light source has a light distribution characteristic with intense radiance in a specific angular direction.

Example 1

Unit: mm

Surface data

| i | ri | di | n(300) | Ri |
|---|---|---|---|---|
| 1 (OB) | infinity | 3.000 | | 1.50 |
| 2 | −13.717 | 11.624 | 1.5 | 5.98 |
| 3 | −12.612 | 0.200 | | 11.95 |
| 4 | −97.685 | 11.188 | 1.5 | 18.68 |
| 5 | −26.296 | 1.144 | | 20.60 |
| 6 | 239.025 | 12.011 | 1.5 | 25.61 |
| 7 | −51.762 | 169.179 | | 26.35 |
| 8 | 150.844 | 16.881 | 1.5 | 41.52 |
| 9 | −110.528 | 0.200 | | 41.42 |
| 10 | 79.159 | 2.000 | 1.5 | 37.07 |
| 11 | 43.767 | 97.030 | | 34.14 |
| 12 | 101.771 | 15.000 | 1.5 | 41.51 |
| 13 | −1091.247 | 54.216 | | 41.01 |
| 14 | 65.735 | 13.027 | 1.5 | 30.91 |
| 15 | −528.752 | 0.230 | | 29.67 |
| 16 | 32.270 | 9.618 | 1.5 | 24.01 |
| 17 | 60.522 | 38.172 | | 22.00 |
| 18 (IM) | infinity | 0.000 | | 8.50 |

Various data

| | |
|---|---|
| f | −6.9 mm |
| Fno | 2.400 |
| Y | 8.500 mm |
| Θ | 70° |
| α | 3.67° |
| φ | 83.04 mm |
| φ1 | 11.96 mm |
| φ2 | 3 mm |
| WD | 1.63 mm |

Conditional expression (1) . . . φ/φ1 = 6.97 > 2
Conditional expression (2) . . . φ2 > WD: 3 > 1.63
φ1 = φ2 + 2WD tanΘ
11.96 = 3 + 2 × 1.63 × 2.75

Example 2

Unit: mm

Surface data

| i | ri | di | n (300) | Ri |
|---|---|---|---|---|
| 1 (OB) | infinity | 3.975 | | 1.50 |
| 2 | −11.881 | 9.505 | 1.5 | 7.75 |
| 3 | −12.327 | 0.200 | | 12.17 |
| 4 | −172.972 | 20.813 | 1.5 | 25.84 |
| 5 | −30.081 | 12.334 | | 28.25 |
| 6 | 114.815 | 19.988 | 1.5 | 42.71 |
| 7 | −109.924 | 194.851 | | 42.97 |
| 8 | 199.638 | 17.755 | 1.5 | 43.25 |
| 9 | −97.910 | 57.375 | | 43.14 |
| 10 | −39.297 | 15.000 | 1.5 | 23.64 |
| 11 | −90.705 | 104.198 | | 26.16 |
| 12 | 118.249 | 15.000 | 1.5 | 31.75 |
| 13 | −81.781 | 9.880 | | 31.49 |
| 14 | 49.330 | 13.258 | 1.5 | 23.96 |
| 15 | −398.203 | 3.869 | | 21.63 |
| 16 | −71.533 | 2.000 | 1.5 | 21.24 |
| 17 | −499.788 | 50.000 | | 20.81 |
| 18 (IM) | infinity | 0.000 | | 12.85 |

-continued

Unit: mm

Various data

| | |
|---|---|
| f | −9.375 mm |
| Fno | 3.100 |
| Y | 12.850 mm |
| Θ | 80° |
| α | −5.14° |
| φ | 86.5 mm |
| φ1 | 15.5 mm |
| φ2 | 3 mm |
| WD | 1.10 mm |

Conditional expression (1) . . . φ/φ1 = 5.58 > 2
Conditional expression (2) . . . φ2 > WD: 3 > 1.10
φ1 = φ2 + 2WD tanΘ
15.5 = 3 + 2 × 1.10 × 5.67

REFERENCE SIGNS LIST

LU Light distribution measuring apparatus
LN Ultraviolet optical system
GrF Objective lens group
GrR Imaging lens group
IM0 Intermediate image
IM Optical image (image plane)
SR Two-dimensional sensor
SS Light receiving sensor surface
AR Measurement area
L1 Normal light
L2 Unwanted tight
AX Optical axis

The invention claimed is:

1. An ultraviolet optical system comprising:
an objective lens group that captures ultraviolet light for each angle from an ultraviolet light source and forms an intermediate image; and
an imaging lens group that re-images the intermediate image,
wherein neither the objective lens group nor the imaging lens group has a cemented surface, and all lenses included in the objective lens group and in the imaging lens group are single lenses that transmit ultraviolet light having a wavelength of 300 nm or shorter, and
the ultraviolet optical system satisfies a following conditional expression (1):

$$\varphi/\varphi 1 > 2 \quad (1)$$

wherein
φ1 is an effective diameter of a lens surface positioned closest to an object side in an objective lens group, and
φ is a maximum effective diameter of lens surfaces in an entire system.

2. The ultraviolet optical system according to claim 1, wherein, with respect to inter-surfaces of all the lenses, difference between a minimum inter-surface distance and a maximum inter-surface distance is equal to or longer than a working distance.

3. The ultraviolet optical system according to claim 2, the ultraviolet optical system including a lens surface closest to an object side having a concave shape on the object side, and the ultraviolet optical system satisfying a following conditional expression (2):

$$\varphi 2 > WD \quad (2)$$

wherein
φ1=φ2+2WD tan Θ holds
when
WD is a distance from a most-object-side position of a most-object-side lens to a measurement area with respect to an ultraviolet light source,
φ2 is an effective diameter of the measurement area with respect to the ultraviolet light source,
φ1 is an effective diameter of a lens surface positioned closest to an object side in an objective lens group, and
Θ is an angle formed by a principal light ray of a light flux having a maximum measurement angle and an optical axis.

4. The ultraviolet optical system according to claim 2, wherein, assuming that an angle formed by an on-axis light ray and an optical axis is a positive angle when the on-axis light ray travels away from the optical axis, an angle α formed by a principal light ray of an off-axis light flux and the optical axis in the intermediate image is a positive angle.

5. A light distribution measuring apparatus comprising the ultraviolet optical system according to claim 2 and a sensor that converts an optical image formed on a light receiving sensor surface into an electrical signal, the light distribution measuring apparatus outputting light distribution of the ultraviolet light source by using the signal obtained by the sensor,
wherein the ultraviolet optical system is positioned such that the intermediate image is re-imaged on the light receiving sensor surface, and the sensor has light receiving sensitivity to ultraviolet light having a wavelength of 300 nm or shorter.

6. The ultraviolet optical system according to claim 1, the ultraviolet optical system including a lens surface closest to an object side having a concave shape on the object side, and the ultraviolet optical system satisfying a following conditional expression (2):

$$\varphi 2 > WD \quad (2)$$

wherein
φ1=φ2+2WD tan Θ holds
when
WD is a distance from a most-object-side position of a most-object-side lens to a measurement area with respect to an ultraviolet light source,
φ2 is an effective diameter of the measurement area with respect to the ultraviolet light source,
φ1 is an effective diameter of a lens surface positioned closest to an object side in an objective lens group, and
Θ is an angle formed by a principal light ray of a light flux having a maximum measurement angle and an optical axis.

7. The ultraviolet optical system according to claim 6, wherein, assuming that an angle formed by an on-axis light ray and an optical axis is a positive angle when the on-axis light ray travels away from the optical axis, an angle α formed by a principal light ray of an off-axis light flux and the optical axis in the intermediate image is a positive angle.

8. A light distribution measuring apparatus comprising the ultraviolet optical system according to claim 6 and a sensor that converts an optical image formed on a light receiving sensor surface into an electrical signal, the light distribution measuring apparatus outputting light distribution of the ultraviolet light source by using the signal obtained by the sensor,
 wherein the ultraviolet optical system is positioned such that the intermediate image is re-imaged on the light receiving sensor surface, and the sensor has light receiving sensitivity to ultraviolet light having a wavelength of 300 nm or shorter.

9. The ultraviolet optical system according to claim 1,
 wherein, assuming that an angle formed by an on-axis light ray and an optical axis is a positive angle when the on-axis light ray travels away from the optical axis, an angle α formed by a principal light ray of an off-axis light flux and the optical axis in the intermediate image is a positive angle.

10. A light distribution measuring apparatus comprising the ultraviolet optical system according to claim 9 and a sensor that converts an optical image formed on a light receiving sensor surface into an electrical signal, the light distribution measuring apparatus outputting light distribution of the ultraviolet light source by using the signal obtained by the sensor,
 wherein the ultraviolet optical system is positioned such that the intermediate image is re-imaged on the light receiving sensor surface, and the sensor has light receiving sensitivity to ultraviolet light having a wavelength of 300 nm or shorter.

11. A light distribution measuring apparatus comprising the ultraviolet optical system according to claim 1 and a sensor that converts an optical image formed on a light receiving sensor surface into an electrical signal, the light distribution measuring apparatus outputting light distribution of the ultraviolet light source by using the signal obtained by the sensor,
 wherein the ultraviolet optical system is positioned such that the intermediate image is re-imaged on the light receiving sensor surface, and the sensor has light receiving sensitivity to ultraviolet light having a wavelength of 300 nm or shorter.

12. A light distribution measuring apparatus comprising an ultraviolet optical system and a sensor that converts an optical image formed on a light receiving sensor surface into an electrical signal,
 wherein the ultraviolet optical system comprises:
  an objective lens group that captures ultraviolet light for each angle from an ultraviolet light source and forms an intermediate image; and
  an imaging lens group that re-images the intermediate image,
 neither the objective lens group nor the imaging lens group has a cemented surface, and all lenses included in the objective lens group and in the imaging lens group are single lenses that transmit ultraviolet light having a wavelength of 300 nm or shorter,
 the light distribution measuring apparatus outputs light distribution of the ultraviolet light source by using the signal obtained by the sensor, and
 the ultraviolet optical system is positioned such that the intermediate image is re-imaged on the light receiving sensor surface, and the sensor has light receiving sensitivity to ultraviolet light having a wavelength of 300 nm or shorter.

* * * * *